C. F. KAHLER.
SLACK ADJUSTER.
APPLICATION FILED APR. 5, 1920.

1,396,218.

Patented Nov. 8, 1921.
2 SHEETS—SHEET 1.

INVENTOR
C. F. Kahler
BY Munn & Co.
ATTORNEYS

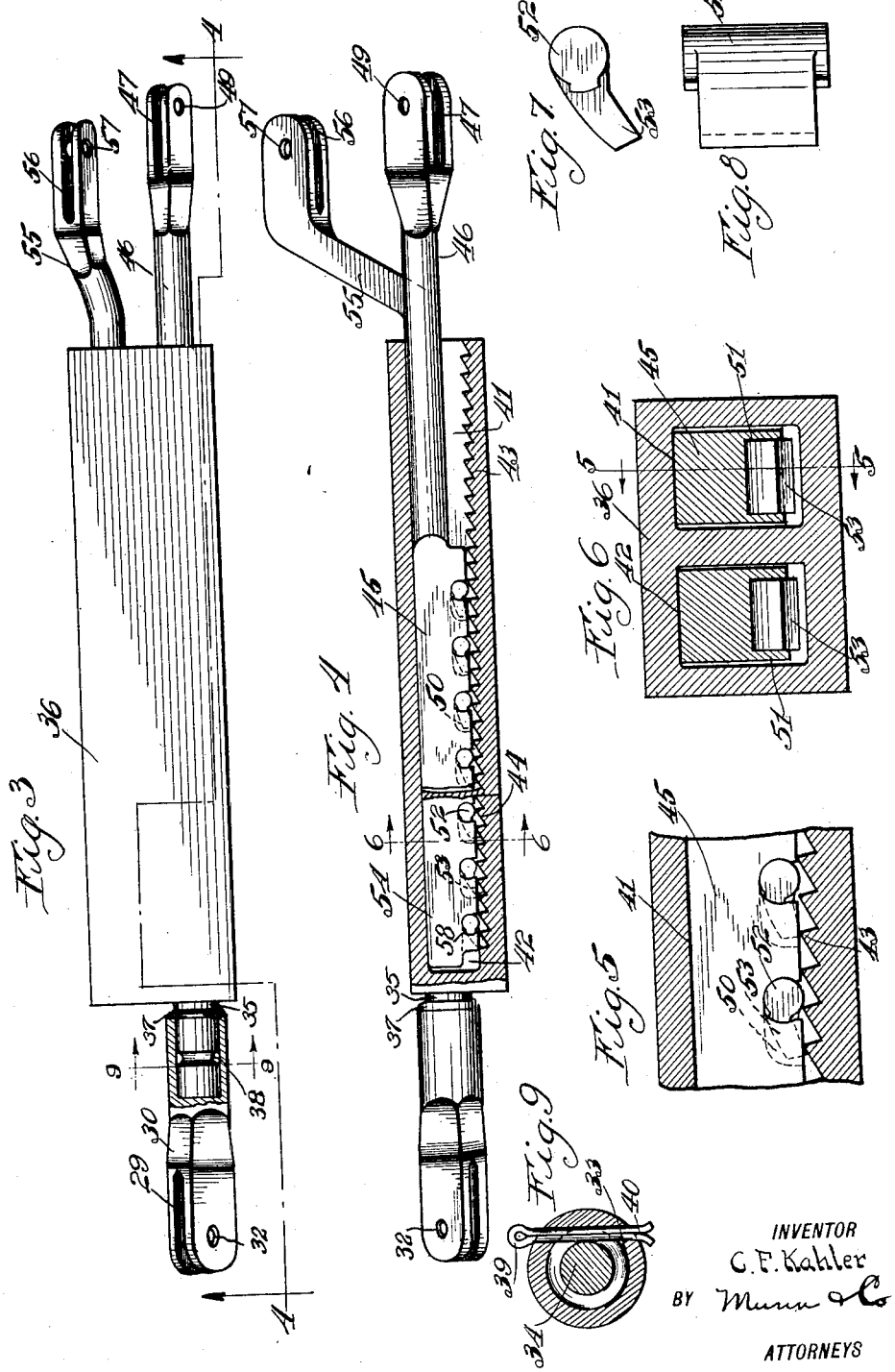

UNITED STATES PATENT OFFICE.

CHARLES FREDERICK KAHLER, OF CHICAGO, ILLINOIS.

SLACK-ADJUSTER.

1,396,218.  Specification of Letters Patent.  Patented Nov. 8, 1921.

Application filed April 5, 1920. Serial No. 371,407.

*To all whom it may concern:*

Be it known that I, CHARLES F. KAHLER, a citizen of the United States, and a resident of the city of Chicago, in the county of Cook and State of Illinois, have invented a new and useful Improvement in Slack-Adjusters for Brakes, of which the following is a full, clear, and exact description.

My invention relates to improvements in slack adjusters for brakes, and it consists in the combinations, constructions and arrangements herein described and claimed.

An object of my invention is to provide a slack adjuster for brakes for railroad cars, in which means is provided for automatically maintaining the brake shoes in the required position with respect to the wheels to insure all brakes being applied uniformly and effectively.

A further object of my invention is to provide a device of the type described in which means is provided to insure the brake shoes being applied to the wheels with minimum travel of the operating parts.

A further object of my invention is to provide a device of the type described which is relatively simple in construction and operation, and which is not liable to get out of order easily.

Other objects and advantages will appear in the following specification, and the novel features of the invention will be particularly pointed out in the appended claims.

My invention is illustrated in the accompanying drawings, forming part of this application, in which—

Fig. 3 is a plan view of a portion of the device,

Fig. 4 is a section along the line 4—4 of Fig. 3,

Fig. 5 is a sectional view of a fragmentary portion of the device along the line 5—5 of Fig. 6, Fig. 6 is a section along the line 6—6 of Fig. 4, Fig. 7 is an enlarged side view of a portion of the device, and Fig. 8 is a plan view of the same.

Fig. 9 is a section along the line 9—9 of Fig. 3.

It is well known that the brake shoe adjusting mechanism now in common use is unsatisfactory in that the brake shoes become worn and then hang away from the car wheels. Consequently, the piston employed in the ordinary form of brake apparatus to operate the means provided for applying the brake shoes to the wheels must travel the maximum distance possible in order to apply the brake shoes. Frequently, the piston strikes the back cylinder head, since the brake shoe will hang away from the wheel as great a distance as three inches. The braking power of the apparatus is therefore reduced, and the length of time required to apply to brakes is increased. The use of my improved slack adjuster for brakes provides a means for maintaining the brake shoes close to the wheels, and consequently, the brakes are applied uniformly without loss of time or braking power and with the minimum travel of the piston and the parts operatively associated therewith.

Figure 1:
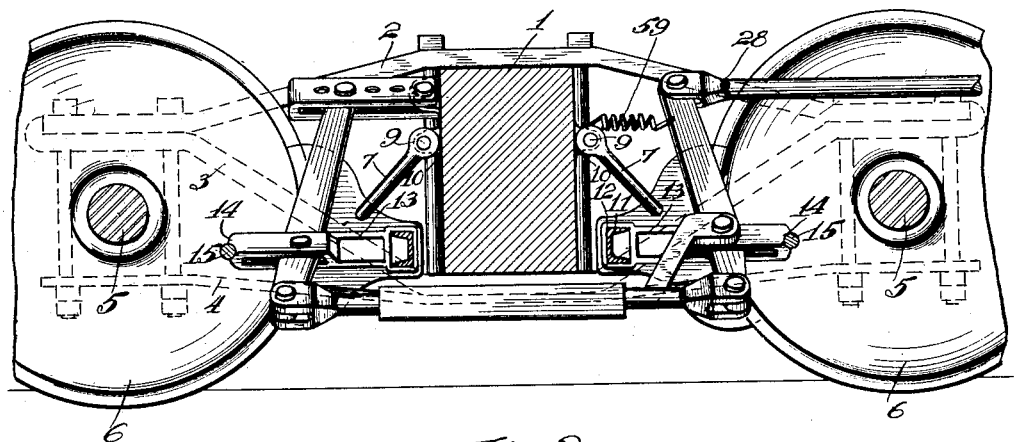
Figure 1 is a side elevation of a car truck, showing the device applied.
Figure 2:
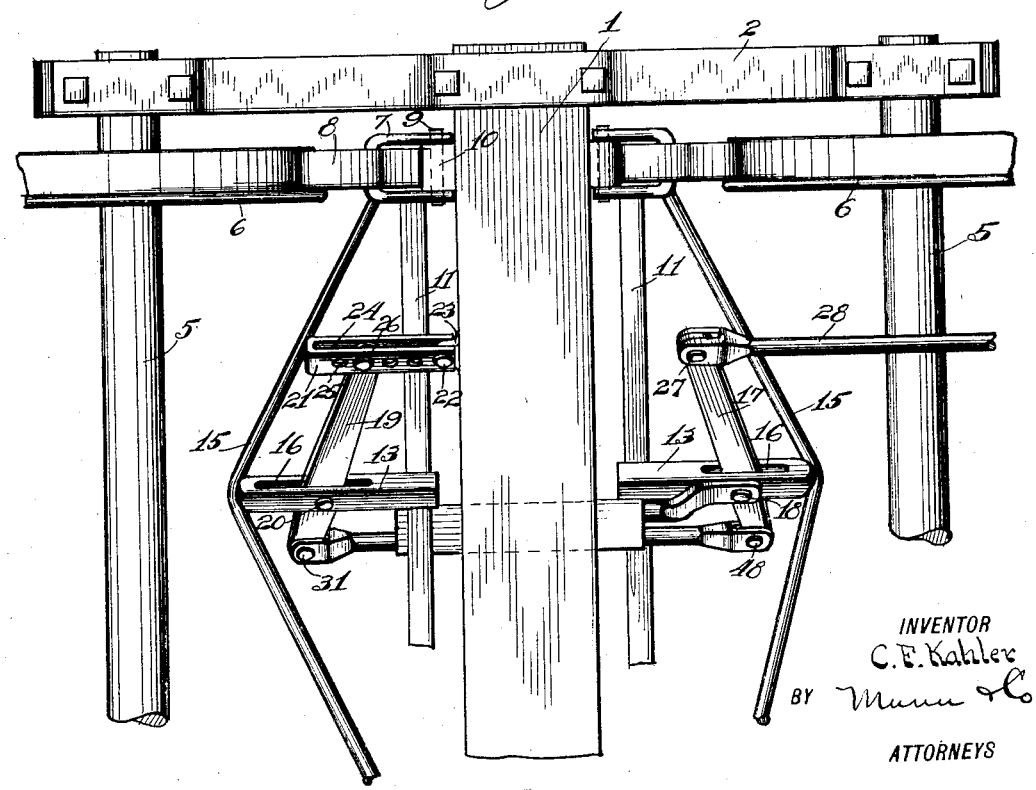
Fig. 2 is a plan view of the mechanism shown in elevation in Fig. 1.

In carrying out my invention, I make use of a brake beam 1 held by bars 2, 3 and 4 about the axles 5 of the wheels 6 in an ordinary manner. A clevis 7, connecting with a brake shoe 8 and pivoted at 9 to a lug 10 which is formed integrally with the brake beam 1, supports the brake shoe 8 and permits the same to be swung toward and away from the wheel 6. A channel iron 11 extends parallel to the brake beam 1, as clearly shown in Fig. 2, and connects the brake shoes 8 for the wheel 6 carried by the opposite ends of the axle 5. The channel iron 11 extends through a recess 12 in the end of a bar 13. By referring to Figs. 1 and 2, it will be noted that the parts arranged on either side of the brake beam 1 are identical with the parts arranged on the other side of the brake beam 1, with the exceptions which will be set forth, and I therefore confine my description of identical parts to the parts found on one side of the brake beam 1. The bar 13 has a groove or socket 14 in its end adjacent the axle 5, and a rod 15 which connects with the brake shoes 8 for the wheels 6 carried at the opposite ends of the same axle 5 is disposed within the socket 14 to maintain the bar 13 in horizontal position. Each bar 13 is formed with a slot 16. A lever 17 extends through the slot 16 and is pivotally fastened therein at a point intermediate its length by a bolt 18. A similar lever 19 extends through the slot 16 in the other bar 13, and is pivotally fastened therein by a bolt 20. A bracket 21, secured at 22 to a lug 23 which is formed integrally with the brake beam 1, has a slot 24 adapted to receive the upper end of the lever 19. A plurality of openings 25 are formed transversely through the slotted bracket 21 and a bolt or pin 26 is inserted through one of the openings 25 and through an opening (not shown) in the upper end of the lever 19, thereby pivotally securing the latter within the slot 24. An operating rod 28 is pivoted at 27 to the upper end of the lever 17 and connects with the actuating apparatus (not shown) of the brake system. The lower end of the lever 19 is received within the slotted end 29 of a link 30, and is pivotally secured therein by a bolt or pin 31 which is inserted through an opening 32 in the slotted end 29 and a registering opening (not shown) in the lower end of the lever 19.

The link 30 is formed with a socket 33 in its other end. The socket 33 is adapted to receive the end 34 of a rod 35 which is formed integrally with a casing 36 as best seen in Fig. 3 of the accompanying drawings. A collar 37 is formed integrally with the rod 35 and bears against the end of the socket 33. The end 34 has an annular groove 38 near its end, in registration with a transverse opening 40 formed through the socket 33. Rotation of the end 34 about its axis can therefore be accomplished, although the insertion of a cotter pin 39 through the opening 40 will prevent displacement of the rod 35, since the cotter pin will engage the walls of the annular groove 38.

The casing 36 is fashioned with similar compartments 41 and 42, each of which is closed at its end adjacent the rod 35 and open at its other end. The compartments 41 and 42 have a cross section clearly shown in Fig. 6 of the accompanying drawings. The compartment 41 is provided with a plurality of teeth 43 in its inner bottom wall. Likewise, the compartment 42 has a plurality of teeth 44 in its inner bottom wall. An enlarged end portion 45 of a rod 46 is slidably disposed within the compartment 41, as best seen in Fig. 4. The rod 46 is formed with a slot 47 in its end. The lower end of the lever 17 is received within the slot 47 and is pivoted therein by a bolt or pin 48 which is inserted through an opening 49 in the rod 46 and a registering opening (not shown) in the lower end of the lever 17. The enlarged end portion 45 of the rod 46, which is of the shape best seen in Fig. 6 of the accompanying drawings, has a plurality of recesses 50 spaced along its bottom edge. A dog or pawl 51 which has side lugs 52 and an integral finger 53, as clearly shown in Figs. 7 and 8 of the accompanying drawings, is inserted within each of the recesses 50 which are adapted to receive the same, and the longitudinal movement of the rod 46 in the direction of the closed end of the compartment 41 is prevented by the engagement of the fingers 53 of the dogs 51 with the teeth 43. Likewise, the compartment 42 is adapted to receive an enlarged end portion 54 of a rod 55, as clearly shown in Figs. 4 and 6. The rod 55 is curved at its end which has a slot 56 provided therein. An elongated opening 57 extends through the walls of the slotted end of the rod 55. The slotted portion of the bar 13 is received within the slot 56 of the rod 55, which is connected therewith by means of the bolt 18 that secures the lever 17 in the slot 16. The enlarged end portion 54 of the rod 55 is provided with recesses 58 which are identical with the recesses 50 provided in the end portion 54. A dog 52 is disposed within each of the recesses 58 and engages the teeth 44 in the manner shown in Fig. 4, thus preventing the longitudinal movement of the rod 55 in the direction of the closed end of the compartment 42.

From the foregoing description of the various parts of the device, the operation thereof may be readily understood. The dogs 52 are placed within the recesses 50 and 58 formed in the end portions 45 and 54 of the rods 46 and 55 respectively. The casing 36 is then rotatably moved approximately 180°, and the end portions 45 and 54 are then inserted within the compartments 41 and 42. The casing 36 is then rotated into the position shown in Fig. 3, when the fingers 53 of the dogs 51 will fall into engagement with the teeth 43 and 44. It will be noted that the recesses 50 and 58 are so arranged with respect to the teeth 43 and 44 that only one of the dogs 52 will be in engagement at one time with the teeth 43, and only one of the dogs 52 will be in engagement with the teeth 54. When either the rod 46 or the rod 45 is moved in the direction away from the closed ends of the compartments 41 and 42, the dogs 52 will successively engage the teeth 43 and 44, a different dog in the series being engaged for every eighth of an inch traveled by the rods 46 and 55.

When it is desired to apply the brake shoes to the wheels, the rod 28 is operated in an ordinary manner. It will be noted that the levers 17 and 19 incline at their upper ends toward each other. Movement of the rod 28 to apply the brakes will pull the upper end of the lever 17 away from the brake beam 11. The bar 13 will be moved in the same direction as the rod 28, and, consequently, the brake shoe 8, located at the same side of the brake beam 1 as the rod 28, will be moved against the wheel 6. At the same time, the rod 46 will be moved in the direction opposite to that taken by the rod 28, and, since the upper end of the lever 19 is pivotally secured to the rigid bracket 21, the brake shoe 8, located at the opposite side of the brake beam 11 from the connecting rod 28, will be applied to the wheel 6 which is on that side. When the brakes are released, the bolt 18 will move a sufficient distance in the longitudinal opening 57 which is formed in the end of the rod 55 to move the brake shoes 8 out of engagement with the wheels 6. A coil spring 59 connecting the upper end of the lever 17 with the brake beam 11 exerts tension to normally hold the brake shoes 8 out of engagement with the wheel 6. The brake shoes will be held closely to the wheels and can be applied uniformly, quickly, and effectively when the operating parts connected thereto move a minimum distance.

I claim:

1. The combination in a slack adjuster for car brakes of two brake levers, means for operating one of said levers, a casing pivoted at one end to one of said levers, said casing being formed to provide a pair of parallel compartments, each open at its free end and each formed with an inner wall thereof serrated to provide similar racks, a bar having one end pivoted to the other of said levers and having its free end portion arranged to enter one of said compartments, the second bar having one end loosely pivoted to said second named brake lever at a predetermined distance above the point of connection of said first named bar with the same lever and having its free end portion arranged to enter the second of said compartments, said bars each having the portion thereof projecting within one of the compartments formed with a plurality of recesses in its wall contiguous to one of said racks, said recesses having reduced openings therethrough and being spaced equi-distant apart, said distance being more than the multiple of the distance between adjacent teeth in said racks, a pawl disposed in each of said recesses and having a portion thereof projecting through the opening to the recess into position to engage with the teeth of said rack, at least one of the pawls in each compartment being in constant operative engagement with the teeth of the rack therein.

2. The combination in a slack adjuster for car brakes of two brake levers, an operating rod connecting with one of said levers, a casing pivoted at one end to one of said levers, said casing being formed to provide a pair of parallel compartments, each open at its free end and each formed with an inner wall thereof serrated to provide similar racks, a bar having one end pivoted to the other of said levers and having its free end portion arranged to enter one of said compartments, the second bar having one end loosely pivoted to said second named brake lever at a predetermined distance above the point of connection of said first named bar with the same lever and having its free end portion arranged to enter the second of said compartments, said bars each having the portion thereof projecting within one of the compartments formed with a plurality of recesses in its wall contiguous to one of said racks, said recesses having reduced openings therethrough and being spaced equi-distant apart, said distance being more than the miltiple of the distance between adjacent teeth in said racks, a pawl disposed in each of said recesses and having a portion thereof projecting through the opening to the recess into position to engage with the teeth of said rack, at least one of the pawls in each compartment being in constant operative engagement with the teeth of the rack therein, and sprng means connecting with said first named brake lever to normally maintain the same out of operative condition.

CHARLES FREDERICK KAHLER.